United States Patent [19]

Wilterdink

[11] 4,267,495

[45] May 12, 1981

[54] MACHINE SPEED CONTROLLER

[75] Inventor: Bernard W. Wilterdink, Claremont, N.H.

[73] Assignee: Cone-Blanchard Machine Company, Windsor, Vt.

[21] Appl. No.: 82,413

[22] Filed: Oct. 5, 1979

[51] Int. Cl.³ .............................................. G05B 19/24
[52] U.S. Cl. .................................. 318/571; 318/39; 318/561
[58] Field of Search ......................... 318/571, 39, 561

[56] References Cited

U.S. PATENT DOCUMENTS

| 3,975,667 | 8/1976 | Bory et al. | 318/571 X |
| 4,023,084 | 5/1977 | Owa | 318/571 X |
| 4,131,837 | 12/1978 | Whetham | 318/571 |

Primary Examiner—B. Dobeck
Attorney, Agent, or Firm—Kenway & Jenney

[57] ABSTRACT

To initiate a scheduled speed change at the correct point in the operating cycle of a machine, a speed change command is subjected to a variable delay. Attaining the commanded speed level too early or too late in one cycle results in the speed change command being correspondingly delayed or advanced in the next cycle. In the preferred embodiment, a low point controller is designed to control the high-to-low speed transition in a multiple spindle bar or screw machine to achieve "feed" speed at the optimum point to decrease cycle time while avoiding damage to the cutting tools.

12 Claims, 11 Drawing Figures

MACHINE SPEED CONTROLLER

BACKGROUND OF THE INVENTION

The invention relates generally to the field of speed control systems and in particular to low point control for bar machines.

In a bar machine, or chucker or screw machine as it is sometimes called, a plurality of metal lathes are served sequentially by a common set of cutting tools. An example is the Conomatic ® C model bar machine manufactured and sold by Cone-Blanchard Machine Company of Windsor, Vt. In the six-spindle bar machine, for example, six solid, cylindrical rods of bar stock, are arranged in parallel in a cylindrical configuration in a spindle carrier which imparts rotation to each rod about its own axis. The protruding ends of the stock are contacted by cutting tools carried by cross-slides and end-slides which shape the side and end surfaces of the stock. The slides are driven by cams on an overhead drumshaft. The tool slides are retracted while the spindle carrier rotates or "indexes" 60° about its axis so as to bring each workpiece to the next tool station. One of the cross-slides is equipped with a tool which cuts off the finished article so that it can drop onto a conveyor. A common drive motor powers continuous rotation of the bar stock, reciprocation of the tool-slides and indexing of the spindle carrier.

The operating cycle comprises a low-speed work or "feed" portion during which the tools continuously engage and work the stock, and a high-speed portion during which the tools move away from the stock, the spindle carrier indexes and the tools travel back to the stock. The feed portion of the cycle must be conducted at uniform low speed to avoid excessive wear of the tools as well as to promote smooth, uniform machining of the stock without overheating. In particular, the drum shaft must be running at low or feed speed when the tools first make contact with the bar stock at the "low point" to avoid damaging the tools. During the high speed portion of the cycle when the tools are retracted and the spindle is indexing the bar stock, the drum shaft speed is typically 20 times higher than feed speed. If the machine reaches the low point still in high speed, the tools can virtually explode upon contact with the bar stock. The machine is not operated in feed speed throughout the entire cycle because retracting the tool-slides and indexing the spindle carrier can be carried out far more rapidly. In some bar machines the optimum ratio of high speed to feed speed is on the order of 200 to 1.

Contrasted with the danger of exceeding feed speed at the low point, the opposite problem of reaching feed speed before the low point increases the cycle time and decreases the production rate. In high volume commodities of the type which are made on bar machines, such as threaded fittings, caps, and collars, price sensitivity emphasizes cost reduction by minimizing cycle time. Thus, in the optimum cycle feed speed is attained precisely at the low point.

In bar machines the substantial deceleration required along with the large inertia of the machine elements makes the timing of the high-to-low transition a difficult control problem. In the past this transition was initiated by a cam-actuated limit switch. Even though the switch was actuated at exactly the same point in each cycle, the point at which feed speed was reached could change from time to time. The timing had to be set to allow for variable performance of certain machine elements. To eliminate the possibility of the cutting tools hitting the work pieces at high speed, it was necessary to schedule the speed change to begin at an angle somewhat earlier than actually required for the average cycle. This constant safety margin greatly increased the cycle time and decreased the efficiency. Moreover, the limit switch frequently had to be readjusted by hand. While it might be possible to improve upon low point control by modifying the mechanical design of the machine, this approach would be inordinately costly and would not facilitate retrofitting existing machines.

SUMMARY OF THE INVENTION

The general object of the invention is to insure that a bar machine is shifted to feed speed exactly at the right point in an operating cycle. A more specific object of the invention is to insure that feed speed is attained precisely at the low point in a bar machine despite variable performance of the machine elements. Another object of the invention is to provide electronic control of the angle at which the speed command is generated based on the point where feed speed is attained in the preceding cycle.

To initiate a scheduled speed change at the correct point in the operating cycle of the machine, a speed change command is subjected to a variable delay which depends on how early in the preceding cycle the machine achieved the commanded speed level in response to the speed command. Attaining the commanded speed level too early or too late in the previous cycle results in the speed command being correspondingly delayed or advanced.

A differential amplifier compares a current speed signal to a prior cycle speed signal representing the speed level actually attained in response to the speed command in the previous cycle. The output of the differential amplifier is sampled at the design point at which the commanded speed level is to be achieved. The sampled output is held as a decrease signal. If the differential amplifier output reaches zero too early, the prior cycle speed signal is integrated from the zero point until the design point to produce an increase signal.

An up/down counter or equivalent stores a particular count which presets a second counter. The second counter is started by an early speed change command signal and after counting the stored number, the second counter issues an output signal which represents the properly delayed speed change command. The up/down counter is incremented or decremented once per cycle according to the increase or decrease signal. If the machine attains the commanded speed level at the design point, no change is made in the stored count. In the preferred embodiment, a low point speed controller is designed to control the point at which feed speed is attained in a multiple spindle screw machine by automatically advancing or retarding the low speed command.

BRIEF DESCRIPTION OF THE DRAWINGS

Other objects, features and advantages of the invention will appear from the following description of a preferred embodiment thereof, taken together with the accompanying drawings, in which.

DETAILED DESCRIPTION OF A PARTICULAR PREFERRED EMBODIMENT

Figure 1:
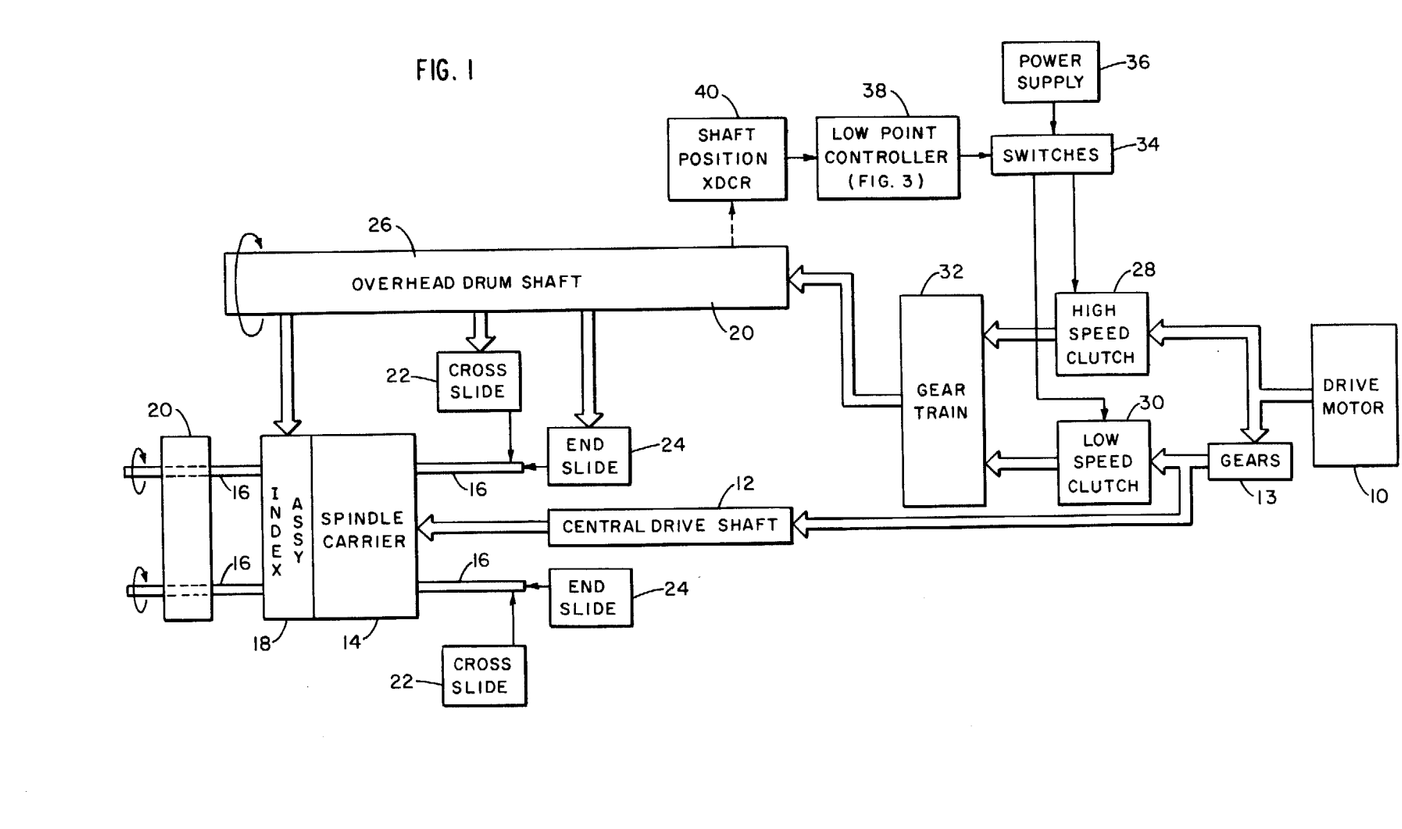
FIG. 1 is a block diagram of the overall mechanical design of the drive train for a bar machine illustrating the relationship of the machine elements to the low point controller according to the invention.

As shown in FIG. 1, a single drive motor 10 supplies motive power for all of the machine elements of the preferred type of bar machine to which the invention is directed. A central drive shaft 12, driven continuously by gears 13, operates the spindle carrier 14 which carries a plurality of parallel spindles holding bar stock 16. The spindles are equally spaced circumferentially about the axis of the central drive shaft 12 like the cylinder of a revolver. An epicyclic gear assembly (not shown) of the spindle carrier 14 imparts continuous rotation to each piece of bar stock about its own axis. The spindle carrier 14 includes an index assembly 18 which causes the spindle carrier to rotate the bar stock about the central axis by an angle 360°/n where n is the number of spindles, and to advance the bar stock at the end of a machining cycle.

The distal ends of the bar stock 16 are rotatingly supported in one of more stock reels 20. The proximate ends of the bar stock 16, that is, the ends to be machined, protrude into a work area which is accessible to a plurality of tool slides comprising transversely reciprocable cross-slides 22 and axially reciprocable end-slides 24. The end-slides 24 are carried on a sleeve (not shown) over the drive shaft 12. The cross-slides 22 and end-slides 24 are operated by means of disk and barrel cams (not shown), respectively on an overhead drum shaft 26. Power to the drum shaft 26 is supplied from either a high-speed clutch 28 or a low-speed clutch 30 by way of a common gear train 32. The clutches are electromagnetic and operate complementarily; that is when the high-speed clutch is operating, the low-speed clutch is not, and vice versa.

Figure 2:
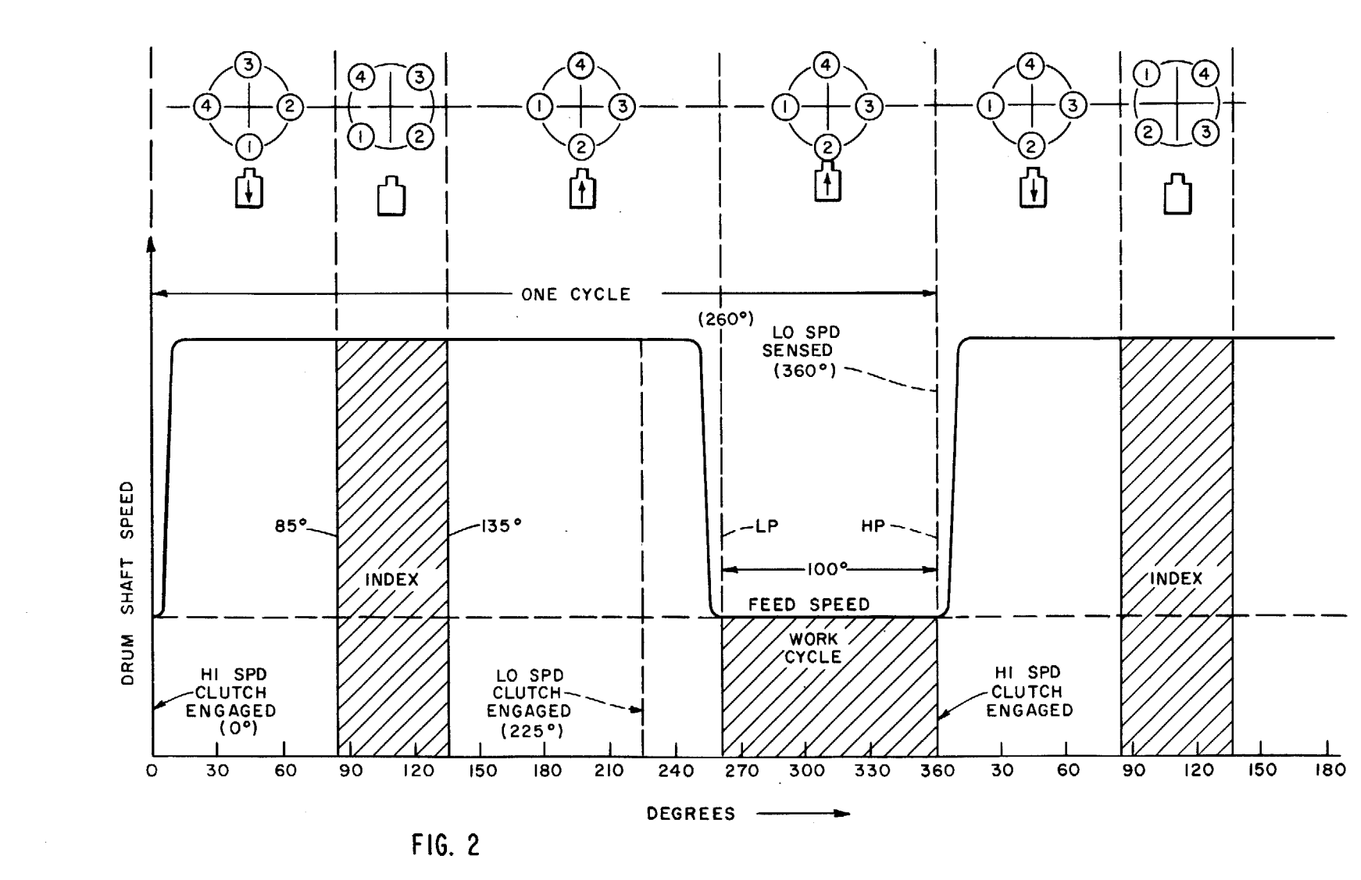
FIG. 2 is a graph showing drum shaft speed versus drum shaft angle in degrees with a schematic representation of the tool slides and spindles.

One complete revolution of the drum shaft causes retraction of the tool slides 22 and 24, a one-step (for example, 90° in a four spindle machine) index of the stock and readvancement of the tool slides as shown in the graph and diagram of FIG. 2. The position of the drum shaft is represented by degrees, one full revolution or one cycle corresponding to 360°. For reference, the 0° or 360° point is chosen as the precise end of the work cycle. Between 0° and 85° the tool slides are retracted. Between 85° and 135° the spindle carrier is indexed and between 135° and 260° the tool slides are advanced into contact with the bar stock. The low point is 260° and the "high point" is 360°. All of the cutting action takes place at feed speed during the last 100° of the full operating cycle. The first 260° belong to the high speed portion of the cycle in which the tools and bar stock are rearranged. Because of the speed difference, however, the machine actually spends considerably more time in feed speed.

In FIG. 1 the clutches 12 and 14 are alternately actuated by switches 34 which apply energizing power from a power supply 36 to the respective clutch. According to the invention, the switches 34 are operated by a low point controller 38 which provides a low-speed command based solely upon timing and information derived from a drum shaft position transducer 40. Each block in the low point controller diagram of FIG. 3 includes a reference to one or more of FIGS. 4–10 where detailed circuitry is shown. The principle of the controller is based upon the assumption that the machine variables that degrade efficiency are of a type commonly called drift. Another way of stating this assumption is that the cycle-to-cycle change is acceptable, but the changes accumulate to an unacceptable total variation over a number of cycles. To eliminate or reduce drift, the controller makes a correction in the timing of each cycle based on the performance in the immediately preceding cycle.

Figure 3:
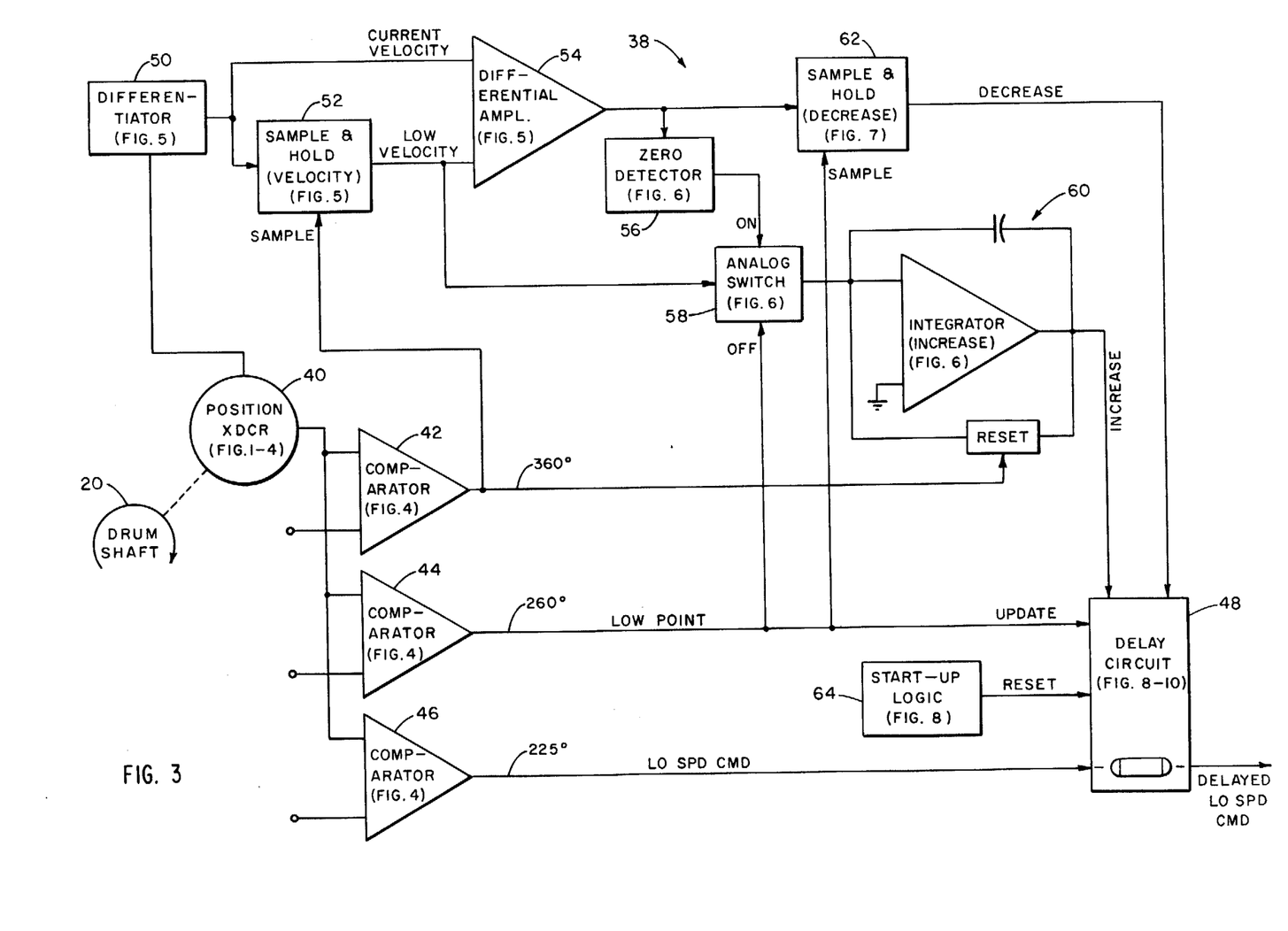
FIG. 3 is a functional block diagram of the low point controller according to the invention.

The functional layout of the controller is diagrammed in FIG. 3 which contains references to FIGS. 4–11 where detailed circuitry is shown. In FIG. 3 an analog position transducer 40 coupled to the drum shaft 26 produces a continuous signal proportional to drum shaft position. This signal, through a bank of voltage comparators 42, 44, and 46, provides step-wave switching functions at predetermined drum shaft angles. The reference voltage of the comparator is at a fixed value corresponding to a specific angle. When the voltage output of the position transducer 40 reaches a level corresponding to the reference voltage, the comparator output changes state. With reference to the graph of FIG. 2, comparators 42, 44, and 46 are pre-set to provide control signals corresponding respectively to 360° at the end of the work cycle, 260, the low point at the beginning of the work cycle, and 225°, the nominal low speed command point where the low-speed clutch should be engaged and the high-speed clutch should be disengaged to begin decelerating toward the feed speed. The low speed command from comparator 46 at 225° corresponds to the actuation of the limit switch which energized the low-speed clutch in the prior art system. In the present controller, however, the low-speed command is applied to a delay circuit 48 which reissues the low-speed command after a controlled delay. The remainder of the functional blocks of the system of FIG. 3 have to do with varying the delay introduced in the low-speed command.

The voltage output of the position transducer 40 is fed to a differentiator 50 which provides an output representing the rate of change of position or instantaneous velocity of the drum shaft 26. The velocity signal is fed to a sample and hold circuit 52 which is gated by comparator 42 at the end of the work cycle to store a signal representing the true feed speed attained in the present cycle. The output of conparator 42 also signals the end of the low speed portion of the cycle reengaging the high speed clutch as explained in greater detail below. However, the low speed sample time for circuit 52 is on the order of 30 milliseconds, during which time the high speed clutch hardly has time to close and no speed change can possibly occur. The stored low velocity signal is compared to the instantaneous velocity signal in a differential amplifier 54. Increase and decrease signals for adjusting the controlled delay in circuit 48 are then derived from the output of the differential amplifier during the time leading up to the next low point, that is the time during which the deceleration takes place with the low clutch engaged. The output of the differential amplifier will eventually reach zero as the deceleration reduces the current velocity to the true feed speed of the preceding cycle. If the differential amplifier reaches zero before the low point (i.e., too early), the zero detector 56 closes an analog switch 58 which remains closed until it is turned off at the low point by comparator 44. During the period that it is closed, the analog switch 58 passes a voltage signal representing the feed speed of the preceding cycle to an integrator 60. The earlier the detection of the zero point in the differential amplifier output, the longer the integrator will be receiving an input and, consequently, the higher the output of the integrator at the low point. Note that the time from detection of low velocity to the actual low point is inversely proportional to the low velocity itself. Thus, the slower the drum shaft is rotating the longer it will take to travel to the low point. While the integrate time is increased by a lower drum shaft velocity, the signal being integrated is lower since it is proportional to drum shaft velocity. These effects cancel resulting in an integrator output proportional to the required delay correction.

Another sample and hold circuit 62 samples the output of the differential amplifier at the low point. If insufficient deceleration has occured and the current velocity has not reached feed speed by the low point (i.e. low speed command too late), the sample and hold circuit 62 will hold a level proportional to the velocity error at the low point. The output of the sample and hold circuit 62 is called the decrease signal. Note that the decrease and increase signals can have only one polarity. If there is a decrease signal, there will be no increase signal and vice versa. They are mutually exclusive.

Immediately following the low point sensed by the comparator 44, the delay stored in the circuit 48 is updated by reference to the level of the increase or decrease signal. If the low-speed command came at exactly the right time, there will not be any increase or decrease signal. If it came too early, there will be an increase signal in order to increase the delay of the low-speed command next time. On the other hand, if the low-speed command came too late, there will be a decrease signal to decrease the delay of the low-speed command next time. The delay per unit level of increase or decrease signal is established by amplifier gain so that the full adjustment to perfect low point control takes several cycles. The update amount is set by the gain of the delay generator to reduce the error in a few cycles without introducing any tendency to hunt. Once the delay has been adjusted to the proper value, any drift is continuously corrected by further action of the increase signal or by action of the decrease signal.

During start-up a few machine cycles are necessary to allow the machine to settle down from any initial tendency to be erratic. At this point it would be nonproductive to provide closed loop control of the low-speed command. Therefore, the delay is held at zero by start-up logic 64 for several cycles after start-up. In this mode, the low-speed command will automatically be produced too early and the analog switch will be closed (on) so that the integrator will produce an increase signal which will gradually increase the delay when the start-up mode ends.

In the more detailed circuit diagrams of FIGS. 4–11, the value of each fixed resistor is 10 kilohms unless otherwise specified. Capacitances are noted in microfarads. All monostable multivibrators or "one-shot" circuits ("OS") are RCA CD 4098 or Motorola MC4098. All operational amplifiers are National Semiconductor LM348, LM 308A or LM741 as indicated. Analog comparators are National Semiconductor LM339A. All NAND gates and logic inverters are RCA CD4011, driver-inverters are ULN 2004, and analog switches ("SW") are CD4066. Where the model number identifies a plural circuit, e.g., a guad amplifier, the corresponding fraction of the integrated circuit is employed.

Figure 4:
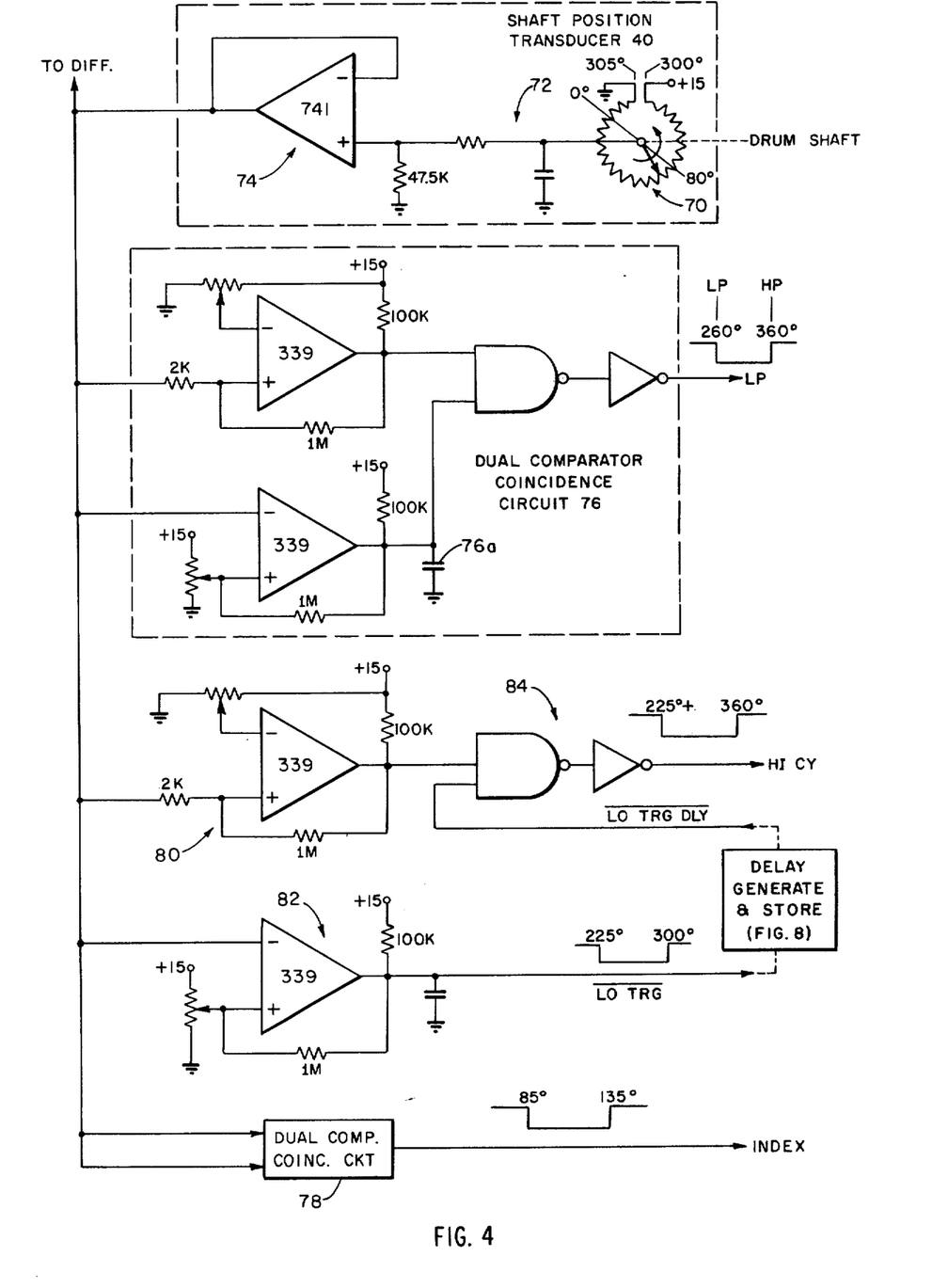
FIG. 4 is a schematic and block diagram of the shaft position transducer and comparator network for producing the requisite signals indicative of specific drum shaft angles in the system of FIG. 3.

FIG. 4 illustrates specific circuitry for the shaft transducer 40 comprising a potentiometer 70 with the wiper connected via an RC network 72 to a voltage follower operational amplifier 74. The potentiometer is phased to the drum shaft so that the maximum voltage point occurs at a drum shaft angle of 300 degrees. The potentiometer has an electrical angle of 355 degrees, hence a dead zone of 5 degrees. Thus the potentiometer output is zero from 300 to 305 degrees and increases linearly from 305 degrees around through 360 degrees to 300 degrees which is the transition point from maximum to zero.

The output of shaft transducer 40 is fed to a dual comparator coincidence circuit 76 which includes a pair of oppositely connected comparators set to respond at 260° and 360°, respectively. ANDing the outputs of the comparators (NAND gate followed by an inverter, as shown) results in a step function LP which is low during the work cycle. In the dual comparator circuit 76, the upper comparator goes low at the transition of the shaft transducer (300°) while the lower comparator goes high. A capacitor 76a at the lower comparator output slows its transition slightly so that the NAND gate, thru this transition sees at least one of its inputs low and its output remains high.

Another dual comparator coincidence circuit 78 indentical in configuration to circuit 76 provides a logic signal INDEX which is low between 85° and 135°; namely, the index portion of the operating cycle of the bar machine. The transducer output is also fed to a pair of comparators 80 and 82. The output of comparator 82 is responsive to 225°, slightly earlier than the nominal low-speed command point. The output of the comparator 82 is referred to as $\overline{\text{LO TRG}}$, i.e., the complement of the low trigger signal. As will be appreciated by glancing ahead to the bottom of FIG. 8, $\overline{\text{LO TRG}}$ is subjected to a variable delay and reissued as $\overline{\text{LO TRG DLY}}$, the complement of the delayed low trigger signal. This signal will of course be identical to $\overline{\text{LO TRG}}$ if there is no delay. In FIG. 4, $\overline{\text{LO TRG DLY}}$ is ANDed with the output of comparator 80 in the gates 84 to produce a logic signal HI CY which is low from 225° (plus whatever delay is introduced) up to 360°, i.e., at the end of the work cycle.

Figure 5:
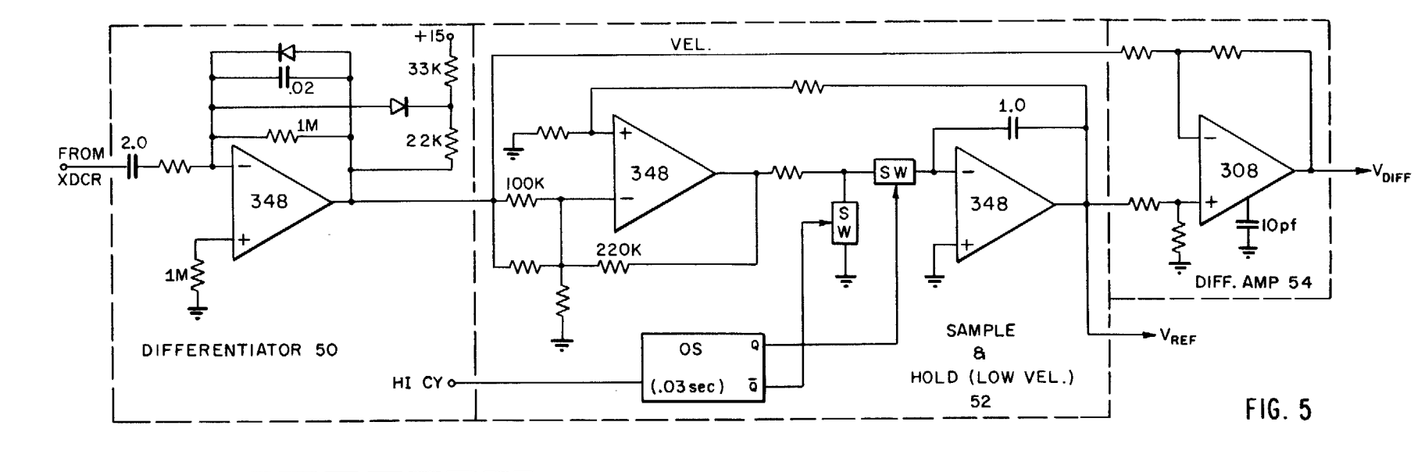
FIG. 5 is a schematic diagram of the differentiator, low speed sample and hold circuit and differential amplifier of FIG. 3.
Figure 6:
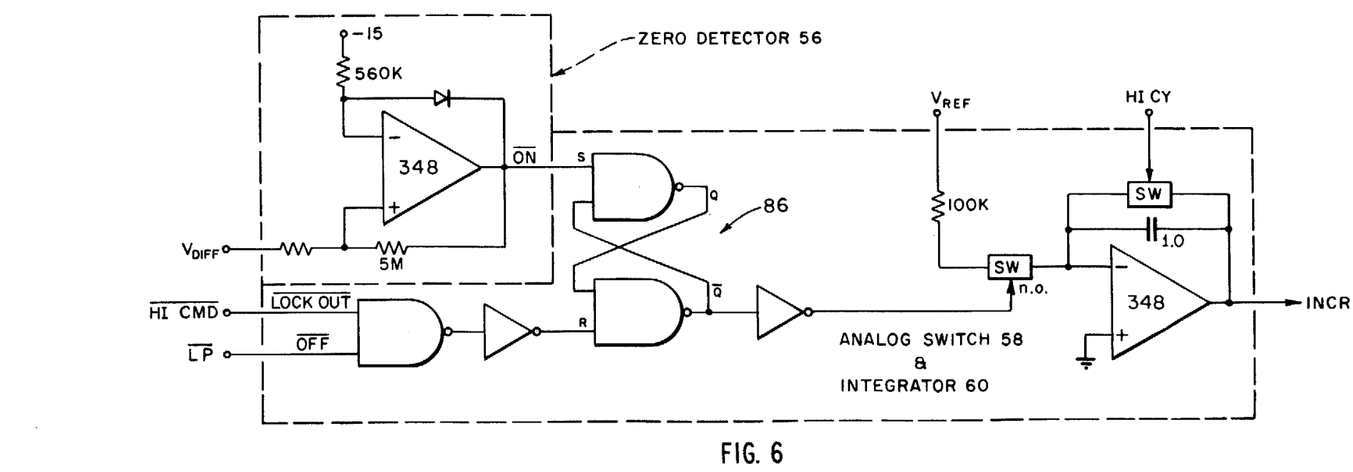
FIG. 6 is a schematic diagram of the zero detector, analog switch and integrator of FIG. 3.

In FIG. 5, the trigger signal for the one-shot circuit in the low velocity sample and hold circuit 52 is the logic signal HI CY. This type of one-shot circuit is triggered by the rising edge of the step wave as, with reference to FIG. 4, signal HI CY goes high at 360°. In the zero detector 56 shown in detail in FIG. 6, the output of the operational amplifier goes high when the $V_{DIFF}$ output of the differential amplifier 54 (FIG. 5) reaches zero thus setting the flip-flop configuration 86. The $\overline{Q}$ output of flip-flop 86 goes low and this signal is inverted to close the analog switch which applies $V_{REF}$ to the integrator 60. The flip-flop 86 is reset by the $\overline{LP}$ signal. The $\overline{HI\ CMD}$, corresponding to the condition in which the low clutch is engaged (see FIG. 11), gates the $\overline{LP}$ reset signal. While the $\overline{LP}$ signal is high between 260° and 360°, the $\overline{HI\ CMD}$ signal is high between 225° and 360°. The analog shunt switch across the feedback capacitor in the integrator 60 in FIG. 6 is responsive to the rising edge of the HI CY signal which occurs at 360° to clear the integrator before the next cycle.

Figure 7:
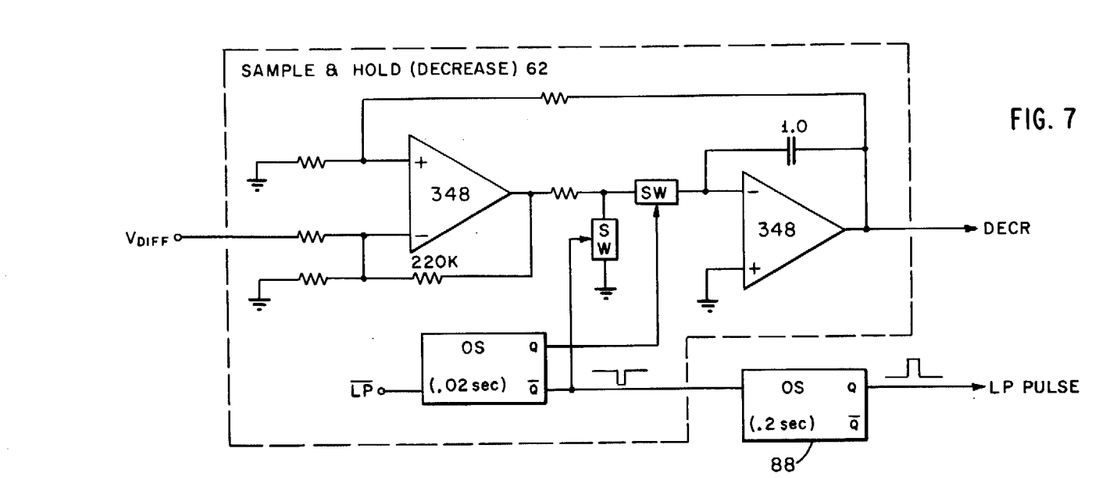
FIG. 7 is a schematic diagram of the decrease sample and hold circuit of FIG. 3.

In FIG. 7, the sample and hold circuit 62 for storing the decrease signal when a late low-speed command has produced insufficient deceleration by the low point is similar to sample and hold circuit 52. However, the trigger input to the 0.02 second one-shot circuit is inverted. $\overline{LP}$ goes low at the low point and is inverted to form the rising trigger signal. The Q output of the sampling one-shot in circuit 62 is fed to a second one-shot circuit 88 which produces a second pulse on the returning rising edge of the $\overline{Q}$ output. The one-shot 88 produces an output termed LP PULSE which has a pulse period of 0.2 second. This pulse is produced 0.02 second after the low point is reached to allow the sample and hold circuit 62 time to register.

Figure 8:
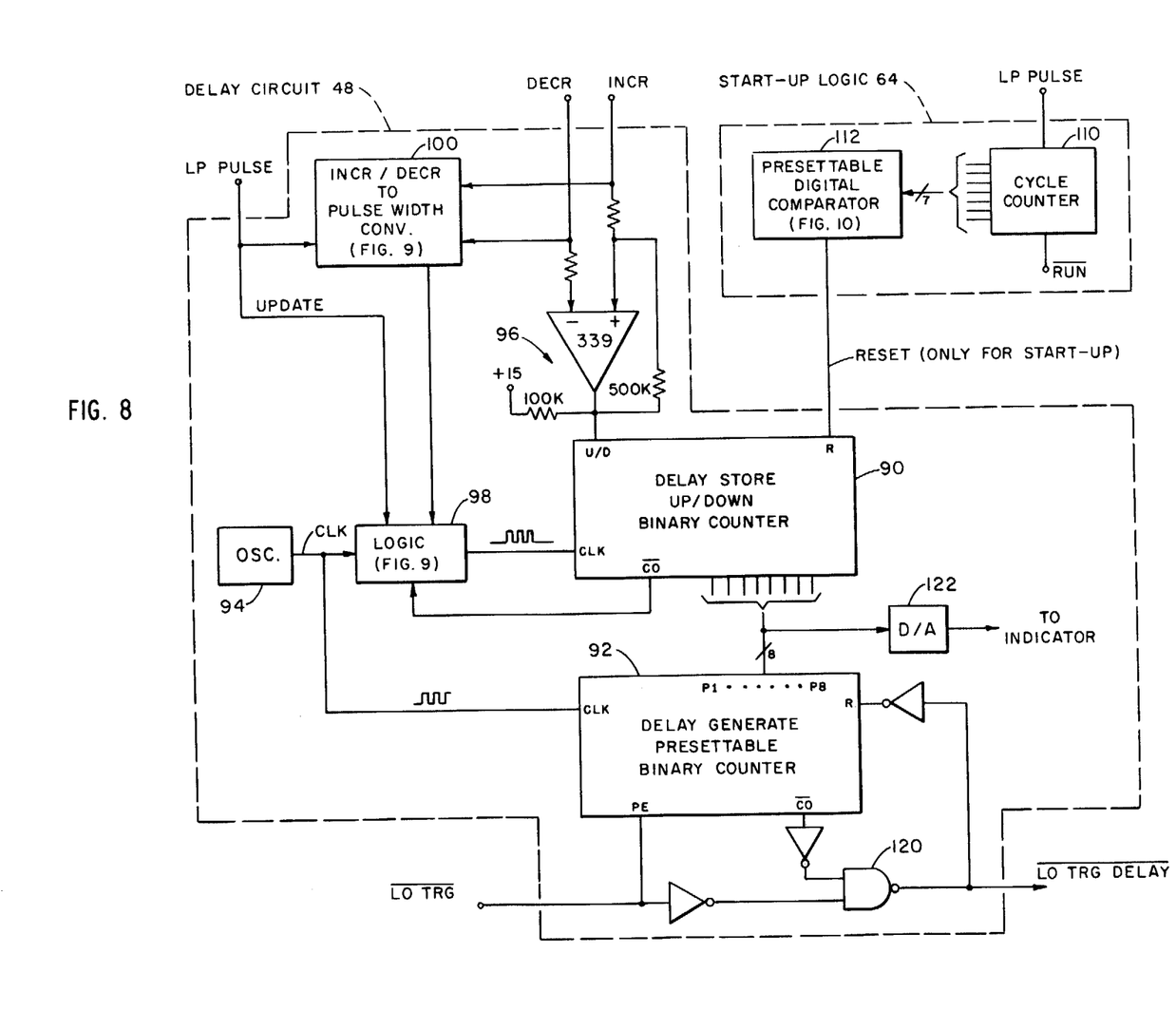
FIG. 8 is a detailed block diagram of the delay and start-up circuits of FIG. 3.

FIG. 8 shows the implementation for the delay circuit 48 of FIG. 3. The heart of the variable delay system comprises a pair of binary counter circuits 90 and 92 designated delay store up/down counter 90 and delay generate presettable binary counter 92. Each of these counters is implemented by cascading two MC14516B (Motorola) presettable up/down four bit binary counters. In normal operation after start-up, delay store counter 90 is not reset after each operating cycle but retains a count cycle after cycle. If low velocity is being attained too early or too late, one of the analog signals INCR or DECR will be presented. The digital output of the delay store counter 90 is fed directly to the preset inputs of the counter 92. Counter 92 is reset once each cycle. As will be explained in greater detail below, the low-speed command starts the counter 92 counting down from the preset number relayed from the delay store counter 90 and when the delay generator counter 92 counts out, its carry-out signal passes the delayed low-speed command. The count rate for counters 90 and 92 is established by clock pulses originating from oscillator 94.

The delay store counter 90 has an up/down control input which is activated by the output of the differential amplifier 96 depending on whether the signal INCR or DECR is present. An INCR signal of any magnitude will result in an up command to the counter 90 and a DECR signal of any magnitude will result in a down command to the counter 90. The counter 90, however, is not continuously clocked; rather, clock pulses from the oscillator 94 are gated by logic circuit 98. When enabled by the LP PULSE immediately following the low point, an increase/decrease-to-pulse-width converter 100 enables the logic circuit 98 to pass a series of clock pulses for an interval which is proportional to the magnitude of the signal DECR or INCR. The output of the logic circuit 98 clocks the delay store counter 90 up or down from its present level to a new level determined by the number of clock pulses passed by the logic circuit 98. The direction of counting is determined by whether the DECR or INCR signal is present.

Figure 9:
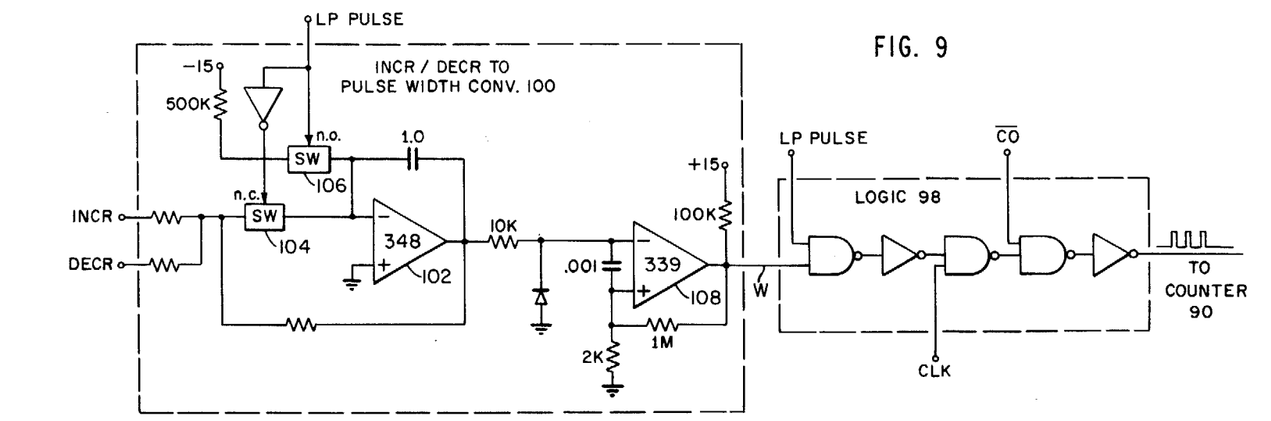
FIG. 9 is a schematic diagram of the increase/decrease to pulse width converter and logic circuit of FIG. 8.
Figure 10:
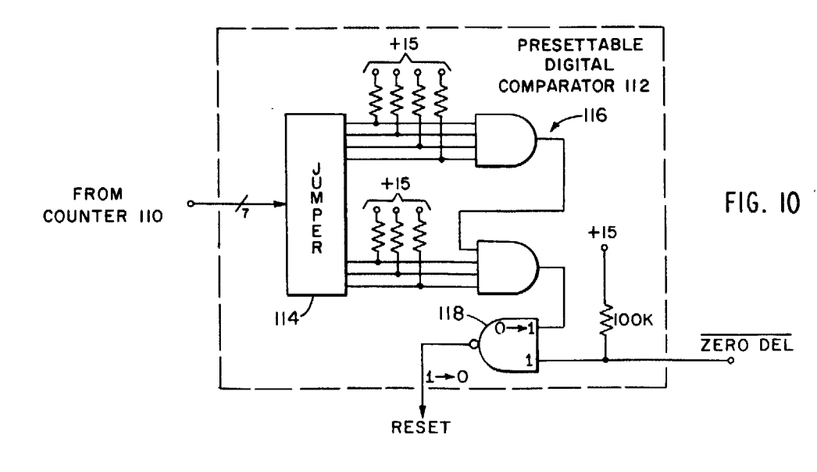
FIG. 10 is a schematic diagram of the presettable digital comparator of FIG. 8.

In FIG. 9 the pulse-width converter 100 is shown in detail. The input to operational amplifier 102 is connected via an analog switch 104. Despite the feedback capacitor, the operational amplifier 102 operates as a voltage follower because of the feedback resistor. Thus the output of the amplifier 102 before the LP PULSE is a replica of the magnitude of the increase or decrease signal. When LP PULSE goes high, the analog switch 104, which is normally closed, is opened disconnecting the input of the amplifier 102 from INCR and DECR. At the same time, another analog switch 106, which is normally open, is closed to connect the input to negative DC via the 500 kilohm resistor. Opening the input switch 104 also disconnects the feedback resistor placing the amplifier 102 in an integrate mode. The integrate mode lasts only as long as the LP PULSE period, 0.2 second. During this time because of the negative DC input connected to the inverting input of the amplifier 102 (as was INCR or DECR before the LP PULSE began), the output of amplifier 102 will start out negative (assuming that there was an increase or decrease signal) and will rise toward zero. The integrator output is passed to analog comparator 108. Thus while the amplifier 102 is producing a negative output, the output of comparator 108 will be a high binary signal. When the output of integrator 102 rises to zero, the output of the comparator 108 goes low. The time it takes for the output of the integrator 102 to rise to zero from the beginning of the LP PULSE will be proportional to the value of the analog INCR or DECR signal present at the beginning of the LP PULSE.

The logic circuit 98 in FIG. 9 is designed so that clock pulses will be passed to the counter 90 starting with the LP PULSE assuming that there is an output from the amplifier 102 due to the presence of an INCR or DECR signal. The clock pulses are cut off by the comparator 108 falling to zero when the integrator 102 has integrated up to the zero point. Thus the number of pulses incrementing or decrementing the counter 90 is proportional to the value stored by integrator 102 at the time the LP PULSE period began. The oscillator 94 in FIG. 8 is preferably operating at a pulse repetition rate of 500 Hertz with a period of 0.002 second. Thus the maximum number of pulses which can be presented during the LP PULSE width is 100. If the current count in the counter 90 were zero, the maximum increase that could be accommodated by 8 bits is 255. If the counter were already at 156, a maximum increase (100 clock pulses) would produce an up count which carried the counter beyond its maximum of 255 and back to zero. To prevent the counter from "overflowing" in this manner, the carry-out bar output $\overline{CO}$ of counter 90 is connected to the logic circuit 98 to block further clock pulses to maintain the counter at the maximum count (255 in the preceding example). Similarly, further clock pulses will be blocked when the counter is decremented to zero (the minimum count) to prevent the converse occurrence of "underflow" beneath zero to 255.

The start-up logic 64 as shown in FIG. 8 is used to hold the delay store counter 90 at zero during the first few cycles by keeping it reset. A cycle counter 110, preferably a Motorola MC4024B seven-stage ripple counter, is connected to be clocked by the LP PULSE. Counter 110 can count up to 127 cycles and is reset when the machine is stopped ($\overline{\text{RUN}}$). The output of the counter 110 is compared to a preset number in the digital comparator 112 shown in detail in FIG. 10. The jumper plug 114 connects the desired combination of the seven parallel outputs of the counter 110 corresponding to a desired number of cycles of the machine during which the counter 90 is to be held at zero. The output of the AND gates 116 is a binary zero until the selected combination of outputs indicates the desired number of cycles have passed. At this point the output of the gates 116 goes high. A $\overline{\text{ZERO DELAY}}$ input is presented to a NAND gate 118 along with the output of the AND gates 116. In normal operation, the $\overline{\text{ZERO DELAY}}$ output is high. The coincidence of the two high inputs to the NAND gate 118 removes the reset command and allows the counter 90 to start counting. For a zero delay after the initial period, a low $\overline{\text{ZERO DELAY}}$ input to the gate 118 is generated so that the counter is continuously reset.

The second function of the delay circuit 48 in FIG. 8 is termed the delay generate cycle. Prior to the start of this cycle the signal at the present enable input of the delay generate counter 92 is high. This preset enable signal allows the counter 92 to follow the output count of the delay store counter 90, since the delay store counter outputs are connected directly to the preset inputs of counter 92. When the $\overline{\text{LO TRG}}$ signal goes low at 225°, the early low-speed command point, the preset enable signal is removed. This in effect disconnects the preset inputs and allows the counter 92 to start counting down. In implementing this circuit, two presettable up/down binary counters (e.g., Motorola MC 14516B) are cascaded and the up/down control is grounded. At the time the $\overline{\text{LO TRG}}$ signal goes low, the $\overline{\text{LO TRG DLY}}$ signal is still high because the transition is blocked by the NAND gate 120. The other input to the gate 120 is the inverted carry-out signal ($\overline{\text{CO}}$) from the counter 92. When the counter counts down to zero, the $\overline{\text{CO}}$ signal goes low and the input to the gate 120 goes high, generating the LO TRG DLY signal. The time from when the $\overline{\text{LO TRG}}$ signal went low up to the time when the $\overline{\text{LO TRG DLY}}$ signal goes low is proportional to the value of the count stored by the preset inputs to counter 92 at the time the $\overline{\text{LO TRG}}$ signal went low (225°). The inverted $\overline{\text{LO TRG DLY}}$ signal resets counter 92 to stop the count when it has reached zero. Counter 92 remains at zero until the $\overline{\text{LO TRG}}$ signal resumes the high state later in the machine cycle. When $\overline{\text{LO TRG}}$ goes high, the preset enable output again allows the counter 92 to follow the output of the delay store counter 90. The output of the delay store counter 90 is also passed to an indicator so that the operator can be apprised of the progress of the delay interval. An analog meter fed by a digital to analog converter 122 enhances the ability to perceive the magnitude of the delay.

Figure 11:
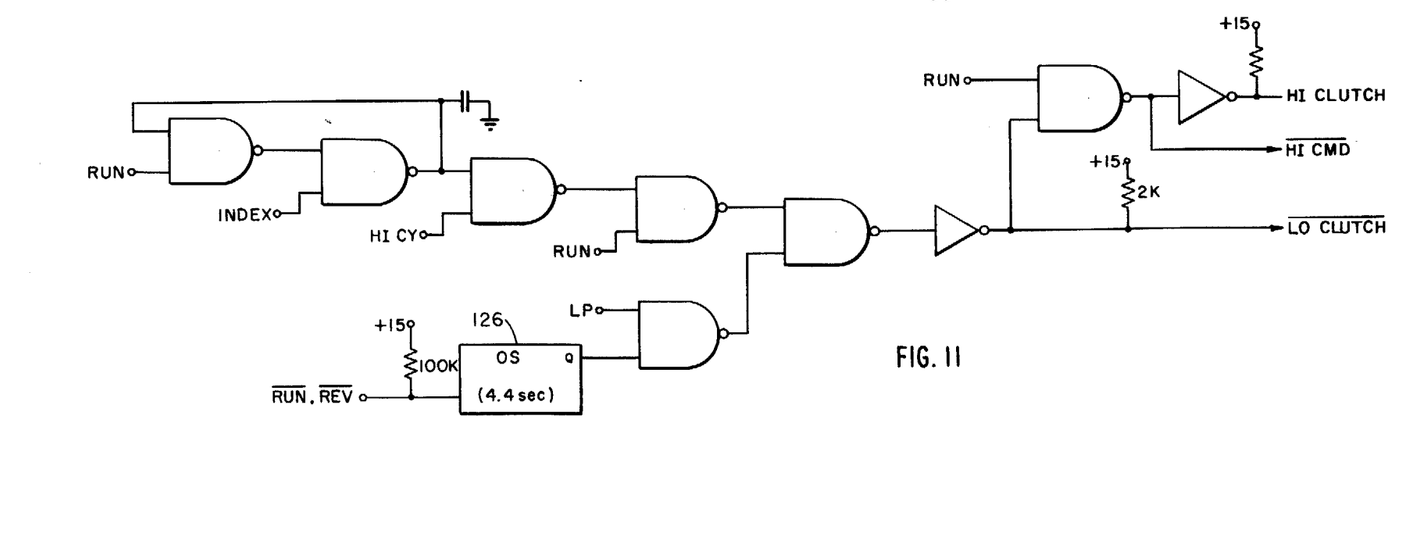
FIG. 11 is a logic diagram of the portion of the motor controller which produces the control signals that actuate the clutches.

FIG. 11 illustrates the logic circuit that produces the high clutch and low clutch actuation command. The RUN logic signal indicates that the machine is cycling not idling. The INDEX signal, produced by comparator 78 in FIG. 4, goes low during the index period. The HI CY signal is produced by gates 84 in FIG. 4 which receives the $\overline{\text{LO TRG DLY}}$ signal from the delay circuit 48 of FIG. 8 and gates it with the output of a comparator which changes state at 360°. Thus the HI CY signal goes low at 225 (plus whatever delay is introduced) and stays low until 360°. HI CY is responsible for energizing the low clutch at the delayed low-speed command point signalled by the $\overline{\text{LO TRG DLY}}$ logic signal and for energizing the high clutch at the end of the work cycle. The RUN signal is brought in at various points in the logic circuit to positively disengage both clutches when the system is supposed to be idling.

The INDEX signal in FIG. 11, and associated gating, causes the low speed clutch to be engaged if the machine is started in the index interval where damaging acceleration rates can be produced.

The one-shot circuit 126 produces a pulse output of several seconds on the command $\overline{\text{RUN.REV}}$. This command corresponds to the situation when the machine is stopped while it is running in its normal forward direction. The output of the one-shot 126 is gated by the logic signal LP to produce a logic signal which will engage the low clutch to act as a brake when the machine is stopped outside the work cycle. The low clutch is brought into play briefly as in "downshifting", to stop the machine more quickly than it would otherwise be with the high clutch disengaged and the machine allowed to "coast". The $\overline{\text{HI CMD}}$ logic signal is just the complement of the HI CLUTCH logic signal and is used in the analog switch 58 to indicate which clutch is engaged.

To summarize the operation of the system, with reference to FIGS. 3–11, the RUN command starts the machine cycle. If the machine is started in the index interval from 85°–135° or in the $\overline{\text{LO TRG}}$ interval from 225° to 360°, the low-speed clutch is engaged, otherwise the high-speed clutch is engaged. The cycle counter 110 in FIG. 8 has been reset by virtue of the machine being in the RUN state before the machine's cycle is begun. The output of the digital comparator 112 holds the delay store counter 90 at zero, thus producing a zero delay for the LO TRG signal which is in effect fed through directly; that is the LO TRG DLY signal is equivalent to the $\overline{\text{LO TRG}}$ signal as shown in FIG. 4. Thus the first time the drum shaft passes the 225° mark, the low-speed command is produced without any delay. This low-speed command point is chosen so that the low-speed command originally comes too early as a safety measure. After several cycles, for example, seven, the digital comparator 112 removes the reset command to the delay store counter 90 and the normal system operation begins. The differentiator 50 in FIG. 3 continues to produce velocity signals which are sampled and held at the end of each work cycle and compared to the current velocity in subsequent cycles. In start-up, the differential amplifier output will always be nulled before the low point resulting in an increase signal. The increase signal causes the delay store counter 90 to be placed in the up-counting condition and the pulse width convertor 100 produces a clock window which allows logic circuit 98 to pass a number of clock pulses proportional to the magnitude of the necessary increase. During the LP PULSE period the delay store counter 90 counts up to a number proportional to the desired increase. In the subsequent machine cycle, $\overline{\text{LO TRG}}$ will be high for the period before 225°, enabling the preset inputs of the delay generate counter 92 to assume the same state as the output of the delay store counter 90. At 225° the $\overline{\text{LO TRG}}$ signal turns off the preset enable. Since the preset count in the counter 92 is a particular number this time, the $\overline{\text{LO TRG DLY}}$ signal is not produced until the counter has counted down to zero. If this delay is insufficient and the low-speed command is still being produced too early, the increase signal will be repeated in the next cycle and the counter 90 will be raised to a higher count to increase the delay. If the low-speed condition is now being reached too late, i.e., after the low point, the decrease signal lowers the count in the counter 90 and reduces the delay proportionately. When the delay is exactly correct, there will be no increase or decrease signal and the counter 90 will retain the same count cycle after cycle.

The speed control system of the invention has been described in connection with its primary intended application, multiple spindle bar machines, in which the high-to-low speed change is of critical importance. While this is the context in which the system was developed, the principles of the invention may be applicable to various control problems where it is desired to attain a specific speed at a predetermined point in the operating cycle.

The key advantage of this system as applied to bar machines is its inherent ability to optimize the machine cycle and increase efficiency. The system offers closed loop control with sufficient flexibility to permit open loop initialization over a selectable number of cycles and adjustable gain to minimize hunting. The system automatically adjusts to occasional changes in the feed speed by referring to the preceding cycles's feed speed rather than a fixed reference. Safety systems can easily be added to provide a logic signal which automatically passes the early $\overline{\text{LO TRG}}$ signal to actuate the low-speed clutch. For example, the ZERO DELAY signal can be produced upon sensing a malfunction, for example, in the extremely remote possibility of oscillator failure.

Because the system is electronic with a low part count consisting mainly of integrated circuits, it is inexpensive and extremely reliable. Existing bar machines now using limit switches can be easily retrofitted with the new low-point controller, simply by adding the shaft transducer and associated electronics. Moreover, production of the clutch actuation signals can be made dependent on any number of other conditions by expanding the logic circuitry to include additional variables if desired.

While a particular preferred embodiment of the present invention has been illustrated in the accompanying drawing and described in detail herein, other embodiments are within the scope of the invention and the following claims.

What is claimed is:

1. A control system for generating a speed change command to attain a nominal speed at a design point in the operating cycle of a machine, comprising
    means for generating an early speed change signal at a predetermined point in advance of said design point in each cycle,
    means for issuing said speed change command following a variable delay initiated by said early speed change signal including delay register means for storing a value indicative of the variable delay applied in the preceding cycle, and delay generate means for generating said variable delay according to the value stored by said delay register means at the time of said early speed change signal, and
    update means for adjusting the value stored by said delay register means after the design point in each cycle in accordance with the direction and extent of deviation from the design point of the point at which the speed in a given cycle reaches the nominal speed.

2. A control system as defined in claim 1, wherein said update means includes
    means for producing an increase signal indicative of the extent of deviation on the early side of said design point, and
    means for producing a decrease signal indicative of the extent of deviation on the late side of said design point.

3. A control system as defined in claim 2, wherein said delay register means includes an up/down binary counter with parallel binary outputs and an up/down control input connected to establish the up or down condition of said up/down counter according to the presence of either said increase or said decrease signal,
    said update means further including an oscillator and gate means for applying the oscillator output to the clock input of said up/down counter for a time period proportional to the magnitude of either said increase signal or said decrease signal.

4. A control system as defined in claim 3, wherein said delay generate means includes
    a presettable binary counter whose preset inputs are connected to the outputs of said up/down counter, said presettable binary counter having a preset enable input responsive to said early speed change command for causing said presettable counter to start counting from the output of said up/down counter to a predetermined number, said presettable counter having an output terminal which changes state when said counter has counted to said predetermined number, said means for issuing said speed command having further means responsive to the state of said presettable counter output terminal for generating said speed change command following said variable delay.

5. A control system as defined in claim 4, further comprising initialization means for resetting said up/down counter to produce a zero delay for a predetermined number of cycles.

6. A control system as defined in claim 1 wherein said update means includes
    first means for sampling and holding a value indicative of the nominal speed of the machine after the design point in each cycle, and
    error sensing means for producing an output indicative of the extent of deviation from the design point of the point at which the speed in a present cycle reaches the nominal speed of the preceding cycle, said update means being responsive to the output of said error sensing means for correspondingly adjusting the value stored by said delay register.

7. A control system as defined in claim 6 wherein said error sensing means includes
    means for determining the difference between the machine speed at the design point in a given cycle and the stored value of the nominal speed attained in the preceding cycle, and
    means for detecting the extent to which the point where the nominal speed in the preceding cycle is reached in a given cycle comes too early with respect to the design point.

8. A control system as defined in claim 7 wherein said means for detecting includes
    means for intergrating the stored value of the nominal speed attained in the preceding cycle over an interval up to the design point from the earlier point at which the speed in a given cycle prematurely reaches the nominal speed attained in the preceding cycle.

9. A control system as defined in claim 6, wherein said error sensing means includes
   differential amplifier means for producing an output indicative of the difference between the current speed and the stored value of the nominal speed attained in the preceding cycle,
   second sample and hold means for storing a decrease signal indicative of the difference between the speed at the design point in a given cycle and the stored value of the nominal speed attained in the preceding cycle,
   integrator means for producing an increase signal having means for resetting itself each cycle, and
   switch means for applying the stored value of the nominal speed attained in the preceding cycle to the input of said integrator means for a period of time beginning with the point at which the output of said differential amplifier indicates that the current speed matches the nominal speed attained in the preceding cycle and ending with said design point.

10. A control system for generating a speed change command to attain a nominal speed at a design point in the operating cycle of the machine, comprising
    means for sampling and holding a value indicative of a nominal speed of the machine after the design point in each cycle,
    error sensing means for producing an output indicative of the extent of deviation from the design point of the point at which the speed in a present cycle reaches the nominal speed of the preceding cycle following the speed command, and
    means responsive to said extent of deviation for altering the time at which the speed command for the next cycle is produced in a manner tending to institute the nominal speed at a point nearer to said design point.

11. A system as defined in claim 10, wherein said speed command altering means includes
    means for generating an early speed change signal at a predetermined point in advance of said design point in each cycle,
    means for issuing said speed change command following a variable delay initiated by said early speed change signal.

12. A system as defined in claim 11, wherein said speed command altering means further includes
    delay register means for storing a value indicative of the variable delay applied in the preceding cycle,
    update means for adjusting the value stored by said delay register means after the design point in each cycle in an amount and direction corresponding to the extent of deviation determined by said error sensing means, and
    delay generate means for generating said variable delay according to the value stored by said delay register means at the time of said early speed change signal.

* * * * *